(12) United States Patent
Niaf et al.

(10) Patent No.: US 12,718,617 B2
(45) Date of Patent: Aug. 25, 2026

(54) METHOD AND SYSTEM FOR CLASSIFYING DACTYLOGRAMS

(71) Applicant: IDEMIA IDENTITY & SECURITY FRANCE, Courbevoie (FR)

(72) Inventors: Emilie Niaf, Courbevoie (FR); Laurent Semy Kazdaghli, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 0 days.

(21) Appl. No.: 18/961,772

(22) Filed: Nov. 27, 2024

(65) Prior Publication Data

US 2025/0232608 A1 Jul. 17, 2025

(30) Foreign Application Priority Data

Jan. 12, 2024 (FR) ....................................... 2400290

(51) Int. Cl.

*G06V 40/12* (2022.01)
*G06V 10/774* (2022.01)
*G06V 10/82* (2022.01)

(52) U.S. Cl.

CPC ........ *G06V 40/1365* (2022.01); *G06V 10/774* (2022.01); *G06V 10/82* (2022.01)

(58) Field of Classification Search

CPC ........................... G06V 40/1365; G06V 10/82
See application file for complete search history.

(56) References Cited

U.S. PATENT DOCUMENTS 11,756,036 B1 * 9/2023 Aggarwal .......... G06V 40/1365 705/44
2003/0133143 A1 * 7/2003 McClurg ................ G06V 40/67 358/1.14
2019/0362130 A1 * 11/2019 Othman ................. G06V 40/13
2022/0147151 A1 * 5/2022 Hong ...................... G06F 3/017
2023/0029578 A1 * 2/2023 Michiels ............... G06T 1/0021
2024/0054774 A1 * 2/2024 Seo .................... G06V 40/1359
2025/0391198 A1 * 12/2025 Hirokawa .......... G06V 40/1376

OTHER PUBLICATIONS

French Preliminary Search Report and Written Opinion Issued May 31, 2024 in FR 2400290 filed on Jan. 12, 2024 8 pages.
Rim, B et al., "Fingerprint classification using deep learning approach", Multimedia Tools and Applications, vol. 80, 2021, 17 pages.

* cited by examiner

*Primary Examiner* — Lixi C Simpson
(74) *Attorney, Agent, or Firm* — Oblon, McClelland, Maier & Neustadt, L.L.P.

(57) ABSTRACT

A computer-implemented method for classifying dactylograms among a plurality of membership classes in which each of the classes corresponds to a specific anatomical region of the palmar face of a hand. The method includes taking, as input data, at least one dactylogram and providing, as output data, a membership class or a list of membership classes to which the dactylogram belongs from among the plurality of membership classes.

13 Claims, 3 Drawing Sheets

5000
5002

5001
I5003
5003

100
90
80
70
60
50
40
30
20
10
0
%
0,3
0,4
0,5
0,6
0,7
0,8
0,9
1
P_k

METHOD AND SYSTEM FOR CLASSIFYING DACTYLOGRAMS

TECHNICAL FIELD

The invention relates to a method and to a system for classifying dactylograms. The invention makes it possible to automatically identify the type of dactylogram acquired by a dactylogram acquisition device.

TECHNICAL BACKGROUND

Dactylograms, generally known better by the terms "fingerprints" and/or "palmprints", are patterns formed by the lines left by the dermatoglyphics of the fingers and/or palms of a hand on surfaces. Dermatoglyphics are the superficial furrows formed on the palms, the soles and the tips of the fingers by the dermal ridges and are arranged in lines or whorls. They are specific to each individual and the patterns that they form constitute a biometric "identity card" for said individual, by virtue of which they are able to be identified.

Recording dactylograms is common practice in various administrative procedures in state institutions and in operations carried out by law enforcement agencies in relation to a suspect or to a defendant within the context of an infraction, an offence or a crime. This recording is generally carried out using suitable dactylogram acquisition devices.

These acquisition devices generally consist of an electronic module comprising an acquisition surface equipped with a sensor on which one or more fingers, the hand or part of the hand are placed in order to acquire an image of the dermatoglyphics thereof.

US 2012 014569 A1, IB KOREA LTD [KR], Jan. 19, 2012 describes a portable dactylogram acquisition device. The device comprises an acquisition surface equipped with a light-emitting sensor on which the fingers of a hand may be placed in order to acquire an image of the dermatoglyphics thereof.

US 2017 046554 A1, NEC CORP [JP], Feb. 16, 2017 describes a portable finger dactylogram acquisition device. This device is configured to provide instructions allowing a user to acquire dactylograms correctly.

At present, dactylograms constitute biometric information used very widely to identify individuals and/or authenticate an operation such as a banking transaction on the Internet or the use, by an individual, of a password from among those stored in a password wallet. However, unlike the authentication in which a dactylogram acquired for an individual is compared with a single or a very limited number of reference dactylograms (1:1), identifying an individual based on a dactylogram requires this dactylogram to be compared with numerous dactylograms acquired beforehand from multiple individuals (1:N) and generally stored in a database.

Because dactylograms are patterns with complex features and because the number of comparisons required during an identification may become very high, comparing dermatoglyphics may be a lengthy process, despite the computing resources of data processing devices currently available. In order to reduce the time needed to carry out these operations, it is known practice to classify dactylograms into various classes based on certain morphological features of the dermatoglyphics. By way of example, these morphological features may be the general shape of the dermatoglyphics (orientation of the loops, arches, whorls, etc.), in particular according to the categories of Henry Faulds, Francis Galton and Edward Henry, the overall profile of the ridges, the "minutiae" consisting of singular points along the ridges (termination of a ridge, bifurcation, etc.), the shape of the ridges, pores or even scars.

U.S. Pat. No. 5,572,597 A1, LORAL CORP [US], 05.11.1996 describes a method for classifying finger dactylograms into various types based on the overall patterns formed by the dermatoglyphics, in particular the ridges and the furrows, of all fingerprints. The classification method is based on analysing the directions and angles formed by the local patterns of the ridges and furrows in small regions of interest in the dactylograms.

EP 0 779 595 A2, NEC CORP [JP], 18.06.1997 describes a method for classifying finger dactylograms into five categories derived from the categories of Henry Faulds, Francis Galton and Edward Henry: the plain arch, the tented arch, the right loop, the left loop and the whorl. The method is based on a combination of the results of two classifiers in order to compute a probability of a fingerprint belonging to one of these four categories.

U.S. Pat. No. 5,825,907 A1, LUCENT TECHNOLOGIES INC [US], 20.10.1998 describes a method for classifying finger dactylograms into five categories derived from the categories of Henry Faulds, Francis Galton and Edward Henry: the right loop, the left loop, the arch, the whorl and the double loop. The method implements an artificial neural network configured to classify finger dactylograms on the basis of a map of the local shapes of the furrows.

Wang et al., Fingerprint Classification Based on Depth Neural Network, arXiv preprint arXiv: 1409.5188, 2014 describes a method for classifying finger dactylograms into the four categories of Edward Henry: the arch, the right loop, the left loop and the whorl. The method, in a first step, implements an artificial neural network trained by unsupervised learning to extract the orientation map of a finger dactylogram—the orientation map of a finger dactylogram corresponds to the general pattern of the direction of the ridges of the dermatoglyphics. In a second step, a logic regression model trained under supervision to carry out fuzzy classification computes the probability of the orientation map belonging to one of the four categories.

U.S. Pat. No. 9,530,042 B1, UNIV KING SAUD [SA], Dec. 27, 2016 describes a method for classifying finger dactylograms into four categories derived from the categories of Henry Faulds, Francis Galton and Edward Henry: the right loop, the left loop, the arch and the whorl. The method first of all implements an operation of computing a feature vector for each finger dactylogram using a descriptor based on a local-gradient directional binary model. The vectors are then processed by an artificial neural network configured to classify the dactylograms into one of the four categories.

Michelsanti et al., Fast Fingerprint Classification with Deep Neural Networks, VISIGRAPP 2017, describes a method for classifying finger dactylograms into the four categories of Edward Henry: the arch, the right loop, the left loop and the whorl. The method implements a VGG-F or VGG-S convolutional artificial neural network trained on a set of finger dactylograms classified into the four categories. This method makes it possible to directly extract features of the dactylograms and therefore to dispense with an intermediate step for this extraction.

EP 3 825 915 A1, IDEMIA IDENTITY & SECURITY FRANCE [FR], May 26, 2021 describes a method for classifying finger dactylograms into a given number of categories derived from the categories of Henry Faulds, Francis Galton and Edward Henry. The method implements a convolutional artificial neural network trained to determine whether or not a finger dactylogram belongs to each category. A dactylogram may possibly belong to multiple categories.

SUMMARY OF THE INVENTION

Technical Problem

Depending on the exploitation and use contexts—for example, a civilian context for administrative and/or border-crossing procedures; a penal context of recording fingerprints of a suspect or of a defendant—the acquisition of types of dactylogram, in addition to finger dactylograms, may be relevant since they contain additional biometric information able to be used as more precise and supplementary means for identifying or authenticating an individual. Therefore, numerous devices, such as those described above, are designed to acquire, in addition to finger dactylograms, other types of dactylogram such as complete and/or partial palmar dactylograms, or even dactylograms of multiple phalanges or multiple fingers.

Like finger dactylograms, for efficient subsequent exploitation of these other types of dactylogram, classifying them is a prerequisite. Furthermore, because they are generally acquired on one and the same device in the course of one and the same acquisition campaign, this classification must a minima distinguish between these various types. However, methods for classifying finger dactylograms are completely unsuitable for such an operation because they exclude all dactylograms other than finger dactylograms.

A first negative consequence is that it is up to the operator themselves to distinguish between or classify the various types of dactylogram in the course of the acquisition campaign. Therefore, careful as they may be, the risk of an error exists both with regard to the correct assignment of the dactylogram to a category and with regard to the identification of dactylograms that are not compliant with the type expected in the acquisition.

A second negative consequence is the inability, which is just as manifest, of the abovementioned current methods to check the integrity, namely the precision, exhaustiveness and reliability, of dactylograms in a database comprising multiple types of dactylogram and, where applicable, to propose corrections. More precisely, these methods are able to check only that a partial palmar dactylogram corresponding to the lower part of a palm has not been accidentally or inadvertently classified as a dactylogram of multiple fingers or phalanges.

There is therefore a need for a method for reliably and automatically identifying and/or classifying dactylograms of different types acquired during multimode acquisition campaigns and/or using in particular multimode devices as described above.

Technical Solution

In a first aspect of the invention, provision is made for a computer-implemented method for classifying dactylograms among a plurality of membership classes in which each of the classes corresponds to a specific anatomical region of the palmar face of a hand. Said method takes, as input data, at least one dactylogram and provides, as output data, a membership class or a list of membership classes to which the dactylogram belongs from among the plurality of membership classes. Said method comprises the following steps:

- providing a convolutional artificial neural network, said convolutional network being trained beforehand on a training dataset consisting of a plurality of dactylograms classified into a plurality of classes in which each of the classes corresponds to a specific anatomical region of a hand, said convolutional network being configured to provide the probabilities of each dactylogram of the set E belonging to each of the classes of the plurality of membership classes;
- inferring, with the aid of the trained convolutional neural network, the probabilities of the dactylogram provided as input data belonging to each of the classes of the plurality of membership classes;
- selecting a membership class from among the membership classes for which the probability of the dactylogram provided as input data belonging thereto is highest among the probabilities of membership inferred for said classes, or a list of a number of membership classes selected from among the plurality of membership classes and sorted in an ascending or descending order of the probabilities of belonging to said classes inferred for the dactylogram provided as input data.

Advantageous embodiments of the first aspect of the invention are described in detail below.

In a second aspect of the invention, provision is made for a data processing device comprising means for implementing a method according to the first aspect of the invention.

In a third aspect of the invention, provision is made for a computer program comprising instructions that, when the program is executed by a computer, cause the latter to implement a method according to the first aspect of the invention.

In a fourth aspect of the invention, provision is made for a computer-readable medium comprising instructions that, when they are executed by a computer, cause the latter to implement a method according to the first aspect of the invention.

In a fifth aspect of the invention, provision is made for a system for classifying among a plurality of membership classes, said system comprising a dactylogram acquisition device and a data processing device according to the second aspect of the invention.

DETAILED DESCRIPTION OF EMBODIMENTS

Figure 1:
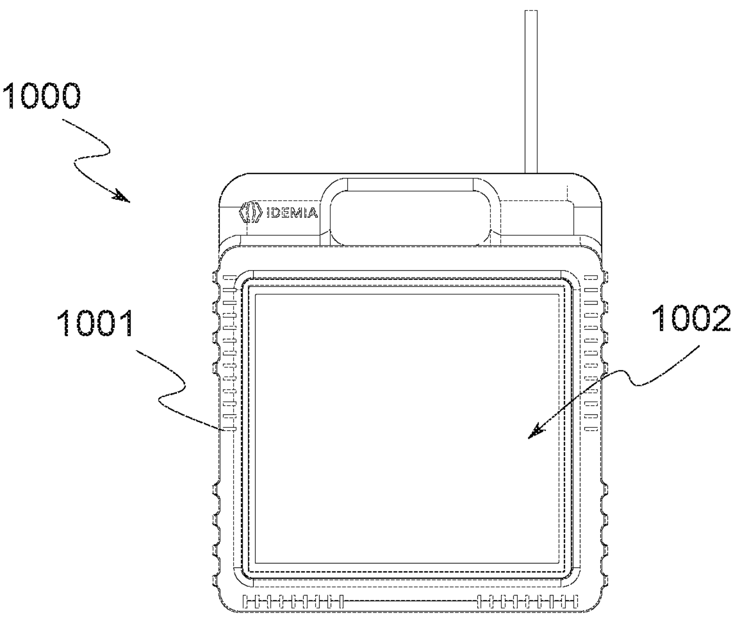
FIG. 1 is an example of a dactylogram acquisition device.

FIG. 1 schematically shows one example of a multimode dactylogram acquisition device 1000 that makes it possible to acquire, in addition to finger dactylograms, other types of dactylogram, such as complete and/or partial palmar dactylograms, or else the dactylograms of multiple phalanges or multiple fingers. The device generally comprises an electronic module 1001 equipped with an acquisition surface 1002 on which one or more fingers, the hand or part of the hand may be placed in order to acquire an image of the dermatoglyphics thereof. Numerous devices of this type are described in the prior art.

The dactylograms acquired by a multimode device such as that described above generally take the form of an image of the patterns formed by the dermatoglyphics. These images may be single-channel images, for example a gray-scale image, or multi-channel images, for example RGB images.

The dactylograms may be classified into multiple membership classes, each of the classes corresponding to a specific anatomical region of the palmar face of the hand to which they correspond. A "palmar face" of a hand is understood to mean the face of the hand containing the palm of the hand, in contrast to the dorsal face. The palmar face comprises the palm and all of the fingers, in other words the thumb, the index finger, the middle finger, the ring finger, the auricular finger, the thenar eminence, the hollow of the palm and the hypothenar eminence. This definition corresponds to that commonly accepted in anatomy.

The number of membership classes is not limited and may be variable depending on the requirements and the exploitation and use contexts. Likewise, the nature of the membership classes, that is to say the anatomical regions of the palmar face of the hand to which they correspond, may be defined or personalized according to the same requirements and exploitation and use contexts.

Figure 2:
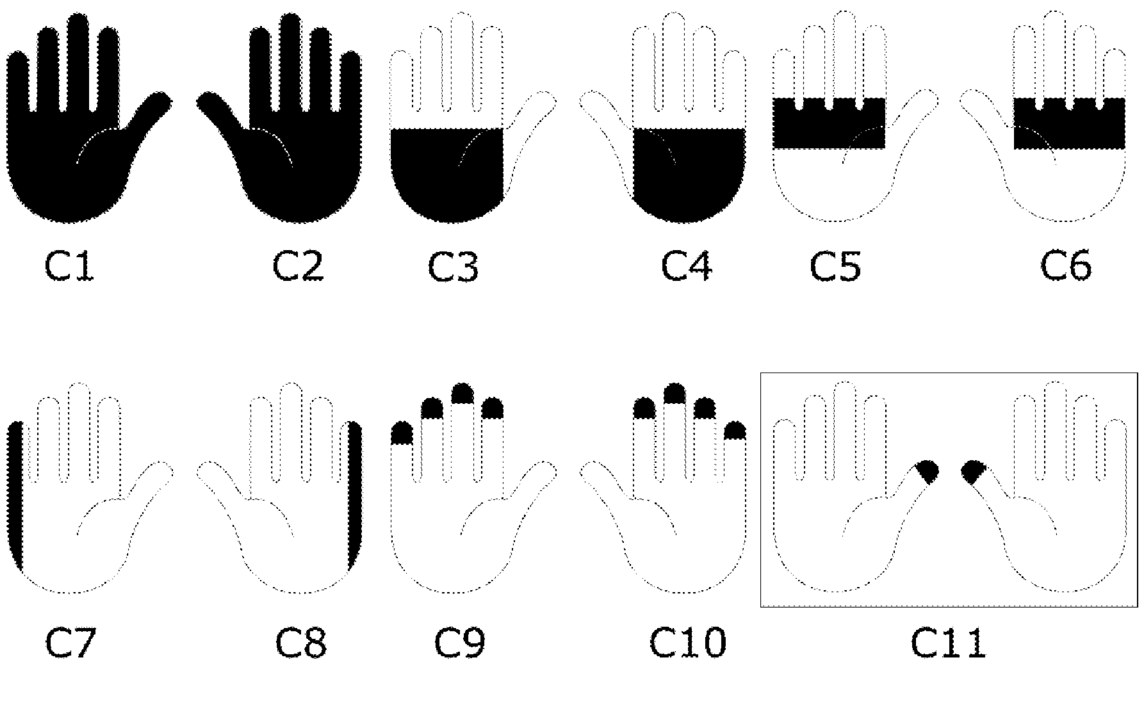
FIG. 2 is a table grouping together examples of schematic representations of classes of dactylograms, in which each of the classes corresponds to a specific anatomical region of a hand.

Nevertheless, in practice, with reference to FIG. 2, it is possible to distinguish, among the various types of dactylogram, 11 membership classes C1-C11 corresponding to different anatomical regions of the palmar face of the hand and adapted to a very large number of requirements and use cases: the complete right hand (C1), the complete left hand (C2), a lower region of the palm of the right hand (C3), a lower region of the palm of the left hand (C4), an upper region of the right hand (C5), an upper region of the left hand (C6), the author's right palm (C7), the author's left palm (C8), at least two, preferably three, preferably four, fingers of the right hand (C9), at least two, preferably three, preferably four, fingers of the left hand (C10), and the thumbs of the right hand and of the left hand (C11).

By way of example, in a first context of recording for administrative procedures, it may be advantageous to acquire five different classes, such as a lower region of the palm of the right hand, a lower region of the palm of the left hand, four fingers of the right hand, four fingers of the left hand, and the two thumbs. By contrast, in a second context of recording the fingerprints of a suspect or of a defendant, the number of types of dactylogram and therefore of membership classes may be higher so as to obtain biometric information that is as exhaustive as possible. In addition to the above classes, it comprises one or more classes from among the complete right hand, the complete left hand, an upper region of the right hand, an upper region of the left hand, the author's right palm, the author's left palm.

As explained above, for efficient exploitation and/or efficient acquisition of the various types of dactylogram liable to be acquired, it is necessary to classify them. However, current methods for classifying finger dactylograms are completely unsuitable, with the negative consequences described above.

Figure 3:
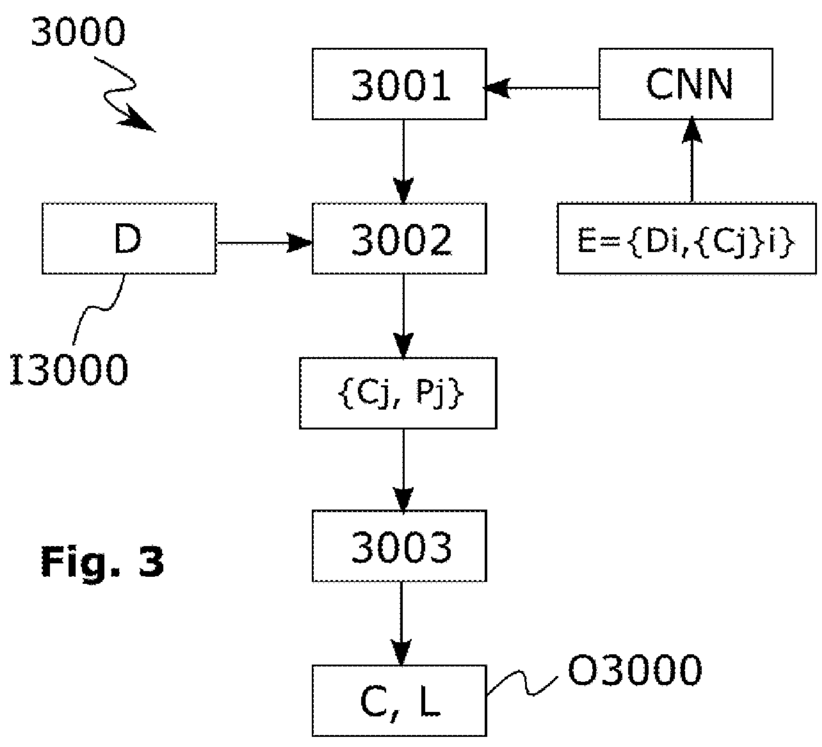
FIG. 3 is a flowchart of a method according to the first aspect of the invention.

Therefore, according to a first aspect of the invention, with reference to FIG. 3, provision is made for a computer-implemented method 3000 for classifying dactylograms among a plurality of membership classes C_j in which each of the classes corresponds to a specific anatomical region Z_i of the palmar face of a hand. The method 3000 takes, as input data I3000, at least one dactylogram D and provides, as output data O3000, a membership class C or a list L of membership classes C_k to which the dactylogram D belongs from among the plurality of membership classes C_j. The method 3000 comprises the following steps:

- providing 3001 a convolutional artificial neural network CNN, said convolutional network CNN being trained beforehand on a training dataset E consisting of a plurality of dactylograms D_i classified into a plurality of classes C_j in which each of the classes corresponds to a specific anatomical region of a hand, said convolutional network CNN being configured to provide the probabilities P_j of each dactylogram D_i of the set E belonging to each of the classes of the plurality of membership classes C_j;
- inferring 3002, with the aid of the trained convolutional neural network CNN, the probabilities P_j of the dactylogram D provided as input data I3000 belonging to each of the classes of the plurality of membership classes C_j;
- selecting 3003 a membership class C from among the membership classes C_j for which the probability P of the dactylogram D provided as input data I3000 belonging thereto is highest among the probabilities P_i of membership inferred for said classes C_j, or a list L of a number k of membership classes C_k selected from among the plurality of membership classes C_j and sorted in an ascending or descending order of the probabilities P_k of belonging to said classes C_k inferred for the dactylogram D provided as input data I3000.

A "plurality of classes" is understood to mean a set comprising at least two classes.

In practice, in the inference step 3002, at the output of the convolutional network CNN, a vector or a list V={P_j} is provided, in which each of the values is the probability P_j of membership for each of the classes of the plurality of membership classes C_j. There is thus a vector V for each dactylogram D provided as input datum I3000.

In step 3001, according to a first alternative, a membership class C is selected from among the membership classes C_j for which the probability P of the dactylogram D provided as input data I3000 belonging thereto is the highest among the probabilities P_i of membership inferred for said classes C_j. This selection operation may be expressed using the following mathematical formula:

$$C = C_l \in \{C_j\},\ P_l = \max\{P_j\}$$

According to a second alternative, what is selected is a list L of a number k of membership classes C_k selected from among the plurality of membership classes C_j and sorted in a descending order of the probabilities P_k of belonging to said classes C_k inferred for the dactylogram D provided as input data I3000.

A first noteworthy advantage of the method according to the first aspect of the invention is that of reducing the risk of an error liable to be made by an operator when assigning a class to a dactylogram during or just after it has been acquired. The method may thus be considered to provide a corrective, monitoring or double-check function during acquisition.

According to a first exemplary implementation, the method according to the first aspect may provide a function of monitoring the expected class of dactylogram during a dactylogram acquisition campaign. By comparing the class that it assigns to a dactylogram that has just been acquired with the class expected for this dactylogram, it makes it possible to check, on-the-fly, that the acquisition campaign is taking place in accordance with a previously established acquisition program such as the acquisition of a single given class of dactylogram or with an order of acquisition of dactylograms of different classes. In the event of a lack of conformity with what is expected, a warning signal may be sent to the operator using any appropriate means. For example, it may in particular be expected, during an acquisition campaign, that multiple dactylograms of different classes will be acquired in a certain order: four fingers of the right hand, then four fingers of the left hand, then the palm of the right hand, then finally the palm of the left hand. If, due to an instruction error on the part of the operator and/or due to a mistake by the person for whom the dactylograms are acquired, a dactylogram of the palm of the left hand is acquired instead of the right, by comparing the class the method assigns to the dactylogram thus acquired to the one expected, a warning signal may be sent to the operator so that they carry out another acquisition.

According to a second exemplary implementation, the method may provide an a posteriori corrective function. At the end of the acquisition of a dactylogram for which an operator has to manually assign a membership class, the method may make it possible to check that the class thus assigned by the operator is correct. For example, the method may check that a dactylogram of a palm of a right hand has not been classified by the operator as a dactylogram of a palm of a left hand. In the event that the class initially assigned by the operator does not correspond to that which the method according to the invention might have assigned, a warning signal may be output by any appropriate means to the operator, so that they are able to validate their classification or correct it on the basis of the class suggested by the method. Just as above, this dual check, in this case first a human check then a machine check, makes it possible to guarantee the accuracy of the classification of the dactylograms and to ensure the integrity of the databases in which the dactylograms are then liable to be stored.

According to a third exemplary implementation, the method may provide an a priori corrective function. As soon as a dactylogram is acquired using a device, it may propose a membership class therefor, or even multiple membership classes sorted in a descending order of their probability of membership value, to an operator, who has the choice of whether or not to validate this proposition, or to choose a class from among those proposed. The risk of incorrect classification by the operator is thus reduced since they have to make a choice of one class or a limited number thereof. Furthermore, in particular in the event that a dactylogram is acquired under challenging conditions, the risk of incorrect classification by the method itself may be eliminated through the intervention of the operator responsible for the final decision with regard to the choice of the assignment class. This dual check, first a machine check then a human check, makes it possible to guarantee the accuracy of the classification of the dactylograms and to ensure the integrity of the databases in which the dactylograms are then liable to be stored.

A second noteworthy advantage of the method according to the first aspect of the invention is that of making it possible to check the integrity of a database of dactylograms of different classes. For example, a database comprising dactylograms of different classes may contain classification errors. The method may advantageously be used to detect and correct these errors by providing thereto, as input data, each of the dactylograms in the database and by comparing the class that it assigns thereto according to the greatest probability of membership with that provided in the database for this dactylogram. In the event of a lack of a match between the two classes, it is possible to carry out automatic correction and/or referencing of the dactylogram in an appropriate list for a subsequent check by an operator.

According to some preferred embodiments, with reference to FIG. 3, the classes of the plurality of membership classes are selected from among the complete right hand (C1), the complete left hand (C2), a lower region of the palm of the right hand (C3), a lower region of the palm of the left hand (C4), an upper region of the right hand (C5), an upper region of the left hand (C6), the author's right palm (C7), the author's left palm (C8), at least two, preferably three, preferably four, fingers of the right hand (C9), at least two, preferably three, preferably four, fingers of the left hand (C10), and the thumbs of the right hand and of the left hand (C11). The plurality of membership classes may thus comprise a number of classes equal to or greater than two, up to all eleven membership classes.

The convolutional artificial neural network is of any type suitable for implementing the method according to the first aspect of the invention. According to some preferred embodiments, the convolutional artificial neural network CNN comprises:

- a first sequence S1 of convolutional artificial neural layers;
- a second sequence S2 of convolutional artificial neural residual blocks;
- a third sequence S3 comprising at least one fully connected artificial neural layer.

The first sequence S1 of convolutional layers has the role, on the one hand, of reducing the dimensions of the dactylogram and, on the other hand, of increasing the number of topographical maps (or feature maps) relevant for the extraction of the patterns and low-level features such as colour distribution and intensity, textures, shapes and local contrasts. The second sequence S2 of convolutional blocks has the role of increasing the receptive field of the network while at the same time improving the extraction of low-level and high-level features by combining topographical maps of different layers via residual connections. The last sequence S3 of fully connected artificial neural layers has the function of combining all of the features extracted by the two previous sequences in order to establish a probability of a dactylogram belonging to each of the classes of the plurality of membership classes.

As explained above, at the output of the sequence S3 of artificial neural layers, each of the values of the vector $V=\{P_j\}$ is a probability $P_j$ of membership for each of the classes of the plurality of membership classes $C_j$. These values are specific to the convolutional network and are generally in the form of real numbers, the distribution of which differs from the usual probability distributions over an interval $[-1;1]$ or $[0;1]$. Therefore, the vector V may be converted using a conversion function, possibly for example a sigmoid conversion function, or preferably a "softmax" conversion function.

Figure 4:
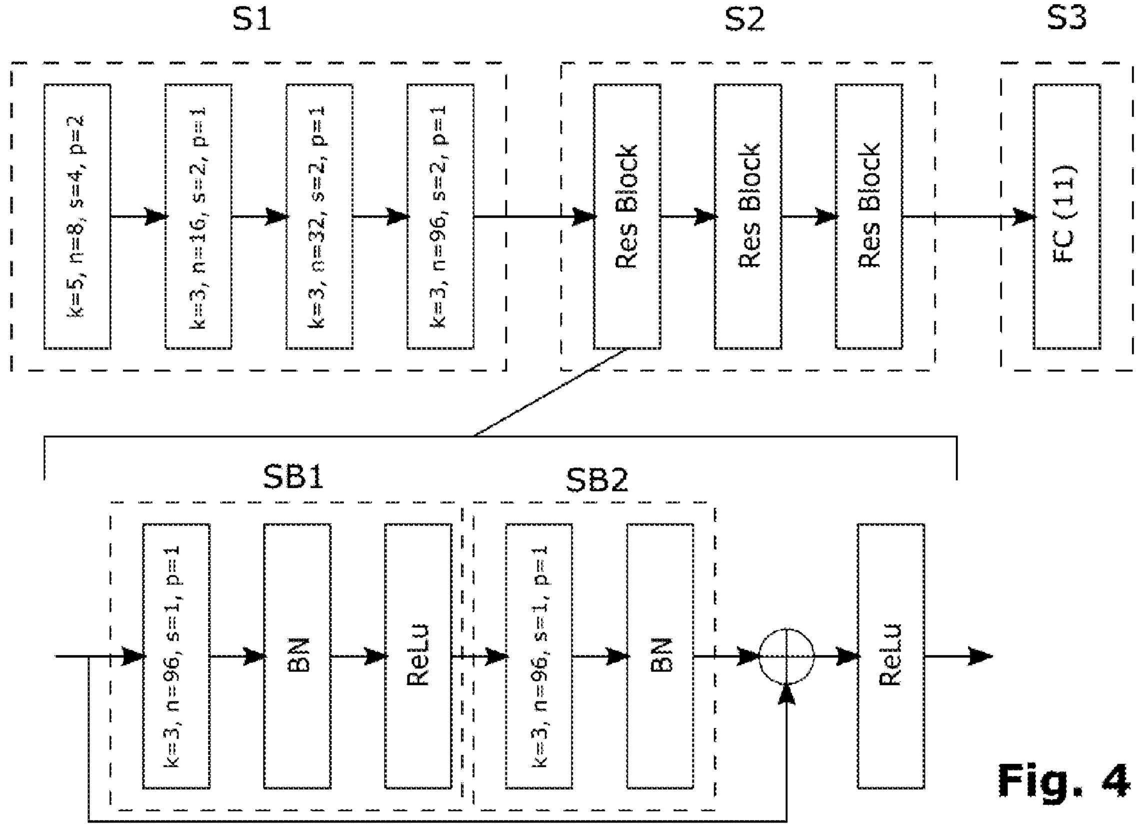
FIG. 4 is a schematic representation of a convolutional artificial neural network architecture according to one exemplary embodiment of a method according to the first aspect of the invention.

FIG. 4 illustrates a detailed example of a convolutional network CNN designed to classify, among the 11 membership classes according to the embodiments described above, dactylograms provided in the form of multi-channel images, such as the RGB format with a resolution equal to or less than 1000×1000 pixels between 100 and 500 dpi. In detail, the convolutional network CNN comprises:

a first sequence S1 of four successive convolutional layers in which the dimension k of their kernel, the number n of instances of their kernel, the stride s and the padding p are respectively: (k=5, n=8, s=2, p=2), (k=3, n=16, s=2, p=1), (k=3, n=32, s=2, p=1) and (k=3, n=96, s=2, p=1), and each convolutional layer being followed by a ReLu correction layer;

a second sequence S2 of three depthwise separable convolution residual convolutional blocks; each of the blocks comprising two sub-blocks SB1, SB2 with a residual connection to the output of the second sub-block, followed by a ReLu correction layer before the input of the following block; the first sub-block SB1 consists of a convolutional layer with n=96 instances of kernels of dimension k=3, a stride s=1, and a padding p=1, a batch normalization layer and a ReLu correction layer; the second sub-block SB2 consists of a convolutional layer with n=96 instances of kernels of dimension k=3, a stride s=1, and a padding p=1, and a batch normalization layer;

a third sequence S3 comprising a fully connected artificial neural layer providing, at output, a vector of dimension 11 in which each of the dimensions corresponds to each of the 11 membership classes described in the context of FIG. 2; possibly, at the output of the second sequence S2 and before the input into the third sequence, the topographical maps may be subject to a flattening operation.

Since the convolutional artificial neural network CNN shown in FIG. 4 is an example, it has no limiting character whatsoever within the scope of the present invention. The number of layers in each of the sequences described above, the dimensions of the convolution kernels, the number of instances thereof, and the stride and padding values may be adapted to the various requirements and use cases of the dactylograms, in particular with regard to the format, the resolution and the acquisition conditions of the images thereof.

According to some additional embodiments, the convolutional artificial neural network CNN furthermore comprises, between the first sequence S1 and the second sequence S2, a spatial resampling step, preferably using bilinear interpolation. The role of this resampling step is that of redimensioning topological maps (or feature maps) obtained at the output of the second sequence into fixed-size topological maps before they are input into the third sequence, and to do so regardless of the size of the dactylograms provided at input of the method or the convolutional artificial neural network. The value of the fixed size to which the topographical maps are reduced corresponds to the number of input neurons of the third sequence comprising at least one fully connected artificial neural layer.

By virtue of this spatial resampling step, the method is able to take dactylograms of any size as input datum. It may thus advantageously be implemented with any type of dactylogram acquisition device without it being necessary to redimension the dactylograms that they are liable to provide. It may also be used to classify dactylograms contained in a database whose sizes are not homogeneous.

The training, also called learning, of the convolutional artificial neural network may be implemented in any suitable manner. According to some advantageous embodiments, the cost function used when training the convolutional artificial neural network CNN comprises a cross-entropy cost function. In concrete terms, a cross-entropy function compares the distribution, q, of probabilities—in the present case the probabilities P_j of belonging to each of the membership classes C_j-predicted by a model (the convolutional artificial neural network CNN), with a distribution, p, of reference probabilities of a training dataset to which the model is applied—in the present case the probabilities, equal to 0 or 1, of the dactylograms of a training set comprising previously classified dactylograms belonging to the classes C_j. The model is trained iteratively by minimizing the divergence between the two distributions. One example of a cross-entropy cost function, f, may be expressed as follows, where j is the number of membership classes C_j:

$$f = H(p, q) = -\sum_j p(j)\log q(j)$$

When, according to some embodiments described above, the convolutional artificial neural network comprises a sequence comprising at least one fully connected artificial neural layer, the cost function may furthermore comprise a conversion function for converting real vectors at output of said layer into a probability distribution over the interval [0; 1]. The conversion function may be for example a sigmoid conversion function or, preferably, a "softmax" conversion function. This function is applied before the cross-entropy function.

Depending on the requirements and the use cases, the method according to the first aspect of the invention makes it possible to differentiate between dactylograms originating from the right hand and those from the left hand, and vice versa. It is preferably sensitive to chirality, that is to say to the relationship of axial symmetry between one hand and the other, for example between a dactylogram of the right palm and that of the left palm. Thus, according to some advantageous embodiments, the cost function used when training the convolutional artificial neural network CNN comprises an axial symmetry sensitivity function.

Such an axial symmetry sensitivity function may be implemented as follows during training. For each dactylogram of a training set, a symmetric dactylogram is first created, obtained through an axial symmetry operation on said dactylogram. Each dactylogram and its symmetrical counterpart are then provided as training input data to the convolutional artificial neural network in order to compute therefrom the probabilities of belonging to each of the classes of the plurality of membership classes. These probabilities of membership, at the output of the network, take the form of a vector whose values correspond to the probability of membership for each of the classes of the plurality of membership classes. There is thus a vector V [D_i] for each dactylogram D_i of the training set and a vector Vs [SD_i] for each corresponding symmetrical dactylogram sD_i.

At the end of this classification step, the vectors V [D_i] are subjected to a symmetry operation consisting in assigning the probability values of a class corresponding to an anatomical region of a hand, for example the right hand, to the corresponding class of the other hand, for example to the left hand; the vector that is thus obtained is denoted S (V

[D_i]). By way of illustrative example, for a plurality of classes comprising the classes "dactylogram of the palm of the right hand" and "dactylogram of the palm of the left hand", the probability of membership in the class "dactylogram of the palm of the right hand" is assigned to the class "dactylogram of the palm of the left hand" and vice versa.

The sensitivity function may then be expressed in the form of a Euclidean distance between the vector Vs [SD_i] and the vector S (V [D_i]), possibly given a weighting factor. Integrated into the above cost function, the sensitivity function may be written:

$$f = -\sum_{j} p(j)\log q(j) + \alpha L_2(Vs[sD_j], s(V[D_j]))$$

When training the convolutional artificial neural network, this distance is minimized via the cost function. To this end, an Adam optimization algorithm may be used.

According to some preferred embodiments, the convolutional artificial neural network CNN is trained using a plurality of sets of training dactylograms, each set comprising dactylograms of identical dimensions. The convolutional artificial neural network is thus not influenced, when it is trained, by potential variations in the dimensions of the dactylograms within one and the same set. The modelling of the relevant features of the dermatoglyphics represented by the dactylograms is then more precise. The dimensions of the dactylograms between the sets may nevertheless be different, in particular when the method is designed to take dactylograms of any size as input datum, according to some embodiments described above.

According to some embodiments, the convolutional artificial neural network CNN is trained on sets of training dactylograms that have previously been enhanced with dactylograms selected from said sets at one or more previously defined frequencies, said selected dactylograms having previously been subjected to an amputation and/or axial symmetry transformation operation.

The addition of amputated dactylograms to the training sets is particularly advantageous in that it makes it possible to reduce the sensitivity of the method to the potential absence of some elements of the dactylograms, for example in the absence of one or more fingers when a hand that has undergone a surgical amputation is involved. The operation of amputating the dactylograms may for example consist in intentionally removing some fingers or some regions of a dactylogram selected from a training set. It may be carried out at the frequency of ⅙, that is to say that, within a training set, one dactylogram out of six is selected and subjected to an amputation operation. The new dactylogram thus obtained is then added to the training set.

The addition of dactylograms that have been subjected to an axial symmetry operation is advantageous in that it makes it possible to improve the sensitivity of the method to chirality and to harmonize, within a training set, the distribution of the dactylograms between those corresponding to the right hand and those corresponding to the left hand. The axial symmetry operation may consist for example in carrying out an axial symmetry operation on a dactylogram selected from a training set, and the new dactylogram thus obtained is then added to said set, its membership class having been modified beforehand in accordance with the left hand or right hand that it represents. This operation may be carried out at a frequency of ½, that is to say that, within a training set, one dactylogram out of two is selected and subjected to an axial symmetry operation.

The sets of training dactylograms may also be enhanced using other known methods, such as changing scale, changing contrast, rotation operations and padding operations.

Figure 5:
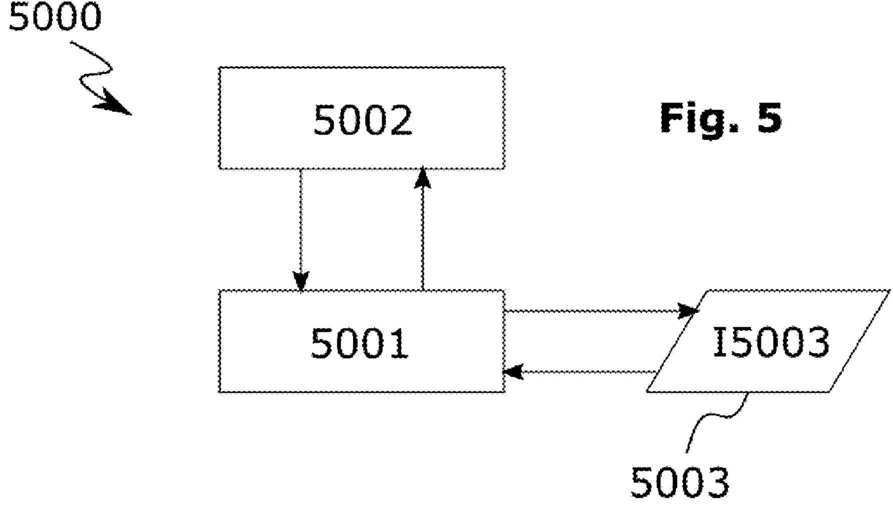
FIG. 5 is a representation of a data processing device according to the second aspect of the invention.

The method according to the first aspect of the invention is computer-implemented. With reference to FIG. 5, in a second aspect of the invention, provision is made for a data processing device 5000 comprising means for implementing a method 3000 according to any one of the embodiments of the first aspect of the invention.

One example of a device may be a device responsible for automatically executing sequences of arithmetic or logic operations in order to carry out tasks or actions. This device, also called a computer, may comprise one or more central processing units (CPUs) and/or one or more graphics processors (GPUs) 5001 and at least one control device designed to execute these operations. It may also comprise other electronic components such as input/output interfaces 5002, non-volatile or volatile storage devices 5003, and communication buses for transferring data between the internal components of the device or with external components. One of the input/output devices 5002 may be a user interface for human-machine interaction, for example a graphical user interface for displaying information understandable to humans.

According to a third aspect of the invention, provision is made for a computer program I5003 comprising instructions that, when the program is executed by a computer, cause the latter to implement a method (3000) according to any one of the embodiments of the first aspect of the invention.

Any type of compiled or interpreted programming language may be used to implement the steps of the method of the invention. The computer program may form part of a software solution, that is to say a collection of executable instructions, codes, scripts or the like and/or databases.

According to a fourth aspect of the invention, provision is made for a computer-readable recording medium 5003 comprising instructions that, when they are executed by a computer, cause the latter to implement a method according to any one of the embodiments of the first aspect of the invention.

The computer-readable recording medium 5003 is preferably a non-volatile memory, for example a hard disk or a semiconductor-based reader. It may be a removable storage medium or a non-removable storage medium forming part of a computer.

The computer-readable recording medium 5003 may also be a volatile memory inside a removable medium. This may facilitate the deployment of the invention in numerous production sites.

The computer-readable recording medium 5003 may form part of a computer used as a server from which executable instructions are able to be downloaded which, when they are executed by a computer, cause the computer to execute a method according to any one of the embodiments described in this document.

The computer program I5003 and the medium 5003 on which it is recorded may be implemented in a distributed computing environment, for example cloud computing. The instructions may be executed on a server to which one or more client computers are able to connect and provide data encoded as input data for a method according to any one of the embodiments of the first aspect of the invention. Once the data have been processed, the result may be downloaded onto and decoded on the client computer or be sent directly, for example, in the form of instructions.

In a fifth aspect of the invention, provision is made for a system for classifying dactylograms among a plurality of membership classes, said system comprising:

a dactylogram acquisition device (1000);

a data processing device (5000) according to the second aspect of the invention, said data processing device (5000) furthermore being configured to receive and process dactylograms D acquired by the dactylogram acquisition device (1000).

According to some embodiments, the data processing device (5000) is furthermore configured to output a warning signal when a dactylogram acquired by the acquisition device is not compliant with the class expected for said dactylogram and/or is assigned to a non-compliant class by an operator of the system. In particular, the device may be configured according to any one of the three exemplary implementations of the method according to the first aspect of the invention described above.

Example

In order to illustrate the performance of the method according to the invention, one example of a method according to some embodiments described above is provided. The convolutional network that is implemented is the one described with reference to FIG. 4. It has been trained on a training set comprising more than 3000 dactylograms classified into the 11 membership classes such as those illustrated in FIG. 2.

Figure 6:
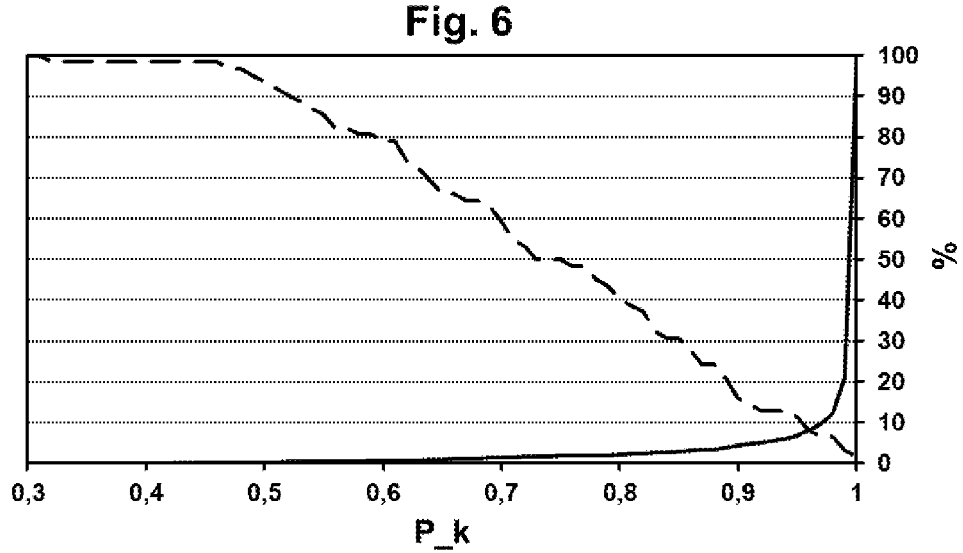
FIG. 6 is a representation of the classification performance of one example of a method according to the first aspect of the invention expressed as a number of successful and failed classifications as a function of the probability of belonging to the class predicted by said method.

FIG. 6 shows the occurrences, expressed as a percentage, of correct (broken line) and incorrect (continuous line) classifications of the dactylograms as a function of the probability of membership values P_K inferred by the method according to the example. The graph shows that 95% of the dactylograms that were classified correctly had a probability greater than 0.9 of being classified correctly. And only 15% of the dactylograms that were classified incorrectly had a probability greater than 0.9 of being classified incorrectly.

By setting, for the probability of membership, a reliability threshold to 0.9, below which the prediction is considered to be unreliable, 5.4% of the dactylograms in the training set are able to be eliminated, and the percentage of correctly classified dactylograms out of the remaining 94.6% of dactylograms reaches 99.7%. It was observed that the 5.4% of the dactylograms in the training set that were thus eliminated corresponded to cases referred to as challenging, for which the assignment of a membership class is not easy, even subject to the expertise of a human operator.

During use, the inference times for a dactylogram provided to a method according to the present example are of the order of a millisecond for a 1600-byte convolutional network with 400000 parameters stored on 32 bits running on an Intel® Core™ i7-7700 CPU.

REFERENCES

Patent Literature

U.S. Pat. No. 5,572,597 A1, LORAL CORP [US], Nov. 5, 1996.

EP 0 779 595 A2, NEC CORP [JP], Jun. 18, 1997.

U.S. Pat. No. 5,825,907 A1, LUCENT TECHNOLOGIES INC [US], Oct. 20, 1998.

US 2012 014569 A1, IB KOREA LTD [KR], Jan. 19, 2012.

U.S. Pat. No. 9,530,042 B1, UNIV KING SAUD [SA], Dec. 27, 2016.

US 2017 046554 A1, NEC CORP [JP], Feb. 16, 2017.

EP 3 825 915 A1, IDEMIA IDENTITY & SECURITY FRANCE [FR], May 26, 2021.

Non-Patent Literature

F. Galton, Fingerprint Directories. London, MacMillan & Co, 1895.

Henry Faulds, Guide to fingerprint Identification, Tokyo, Hanley, 1905.

E. Henry, Classification and uses of finger prints, published by his majesty's stationery office, London, 1913.

Wang et al., Fingerprint Classification Based on Depth Neural Network, arXiv preprint arXiv: 1409.5188, 2014.

Michelsanti et al., Fast Fingerprint Classification with Deep Neural Networks, VISIGRAPP 2017.

The invention claimed is:

1. A computer-implemented method for classifying dactylograms among a plurality of membership classes in which each of the classes corresponds to a specific, different anatomical region of a palmar face of a hand, said method taking, as input data, a dactylogram and providing, as output data, a membership class or a list of membership classes to which the dactylogram belongs from among the plurality of membership classes, said method comprising:

providing a convolutional artificial neural network, said convolutional network being trained beforehand on a training dataset consisting of a plurality of dactylograms classified into a plurality of classes in which each of the classes corresponds to a specific, different anatomical region of a hand, said convolutional network being configured to provide probabilities of each dactylogram of the training data set belonging to each of the classes of the plurality of membership classes;

inferring, using the trained convolutional neural network, the probabilities of the dactylogram, provided as input data, belonging to each of the classes of the plurality of membership classes; and determining which part of the hand the input dactylogram corresponds to by selecting a membership class from among the membership classes for which the probability of the dactylogram provided as input data belonging thereto is highest among the probabilities of membership inferred for said classes, or a list of a number of membership classes selected from among the plurality of membership classes and sorted in an ascending or descending order of the probabilities of belonging to said classes inferred for the dactylogram provided as input data.

2. The method according to claim 1, wherein the classes of the plurality of membership classes are selected from among a complete right hand, a complete left hand, a lower region of the palm of the right hand, a lower region of the palm of the left hand, an upper region of the right hand, an upper region of the left hand, a side of a right palm, a side of a left palm, at least two fingers of the right hand, at least two fingers of the left hand, and the thumbs of the right hand and of the left hand.

3. The method according to claim 1, wherein the convolutional artificial neural network comprises:

a first sequence of convolutional artificial neural layers;

a second sequence of convolutional artificial neural residual blocks; and a third sequence comprising at least one fully connected artificial neural layer.

4. The method according to claim 3, wherein the convolutional artificial neural network further comprises, between the first sequence and the second sequence, a spatial resampling step.

5. The method according to claim 1, wherein a cost function used when training the convolutional artificial neural network comprises a cross-entropy cost function.

6. The method according to claim 1, wherein a cost function used when training the convolutional artificial neural network comprises an axial symmetry sensitivity function.

7. The method according to claim 1, wherein the convolutional artificial neural network is trained using a plurality of sets of training dactylograms, each set comprising dactylograms of identical dimensions.

8. The method according to claim 7, wherein the convolutional artificial neural network is trained on sets of training dactylograms that have previously been enhanced with dactylograms selected from said sets at one or more previously defined frequencies, said selected dactylograms having previously been subjected to an amputation and/or axial symmetry transformation operation.

9. A data processing device comprising processing circuitry configured to implement the method according to claim 1.

10. A system for classifying dactylograms among a plurality of membership classes in which each of the classes corresponds to a specific anatomical region of the palmar face of a hand, said system comprising:

a dactylogram acquisition device; and the data processing device according to claim 9, wherein said data processing device is further configured to receive and process dactylograms acquired by the dactylogram acquisition device.

11. The system according to claim 10, wherein the data processing device is further configured to output a warning signal when a dactylogram acquired by the acquisition device is not compliant with a class expected for said dactylogram and/or is assigned to a non-compliant class by an operator of the system.

12. A non-transitory computer-readable medium comprising instructions that, when executed by a computer, cause the computer to implement the method according to claim 1.

13. A method, comprising:

for each dactylogram in a database of dactylograms of different classes, using the method according to claim 1 to determine the membership class of the dactylogram, and compare the determined class to a predetermined class stored in the database for the dactylogram, so as to check the integrity of the database of dactylograms.

* * * * *